March 24, 1925.  
F. G. MEYER  
GREASE CUP  
Filed Nov. 28, 1921  
1,530,509

Inventor  
Fred G. Meyer.  
By B. F. Wheeler  
Attorney

Patented Mar. 24, 1925.

1,530,509

UNITED STATES PATENT OFFICE.

FRED G. MEYER, OF DETROIT, MICHIGAN.

GREASE CUP.

Application filed November 28, 1921. Serial No. 518,169.

*To all whom it may concern:*

Be it known that I, FRED G. MEYER, a citizen of the United States, residing at Detroit, in the county of Wayne and State of Michigan, have invented a new and useful Grease Cup, of which the following is a specification.

This invention relates to grease cups. It is one object of the invention to provide a grease cup plunger which will on the discharge stroke firmly engage the cup to establish a seal against back-flow of grease, and which will move with relative freedom on the opposite stroke.

In attaining these objects, the invention contemplates forming a grease cup plunger of a plurality of thin flexible metallic disks, alternating with dished washers, and compelled by suitable clamping means to conform to the dished form of said washers, said disks having free marginal portions in contact with the grease cup so that the resistance encountered by said portions on the discharge stroke of the plunger acts to slightly decrease the flare of said marginal portions and correspondingly increase the sealing pressure of said disks upon the grease cup wall.

A preferred embodiment of the invention is hereinafter described and is illustrated in the accompanying drawing, wherein, Fig. 1 is a view in side elevation of the improved grease cup.

Figure 2:
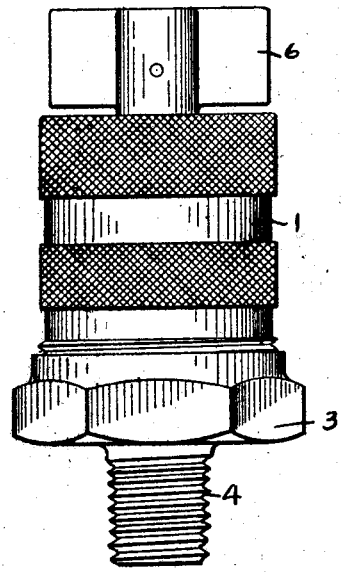
Fig. 2 is an axial sectional view of the same.
Figure 1:
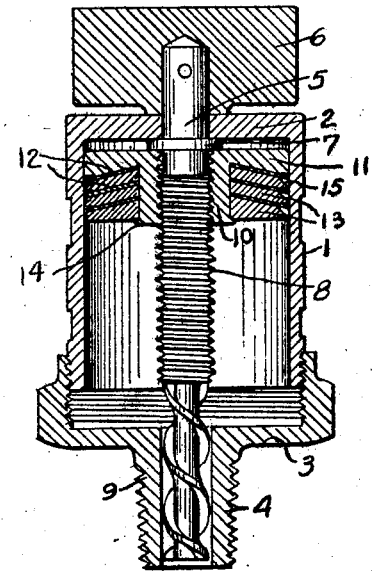
Figure 3:
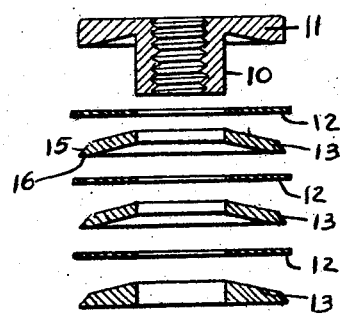
Fig. 3 is a disassembled view of the plunger.

In these views, the reference character 1 designates a grease cup having an integral top 2 and closed at its bottom by a base 3 formed with an interiorly threaded marginal flange into which the member 1 is threaded. Said base is formed with a central depending nozzle or discharge portion 4 threaded for engagement with the part to be lubricated. Within said cup there is axially disposed a stem 5, which rotatively projects through the top 2, and carries an actuating knob or handle 6 above said top. Just below said top, a collar 7 is rigidly carried by the stem, co-acting with the handle 6 to restrain the stem from any longitudinal movement. The portion of said stem lying within the cup 1 is threaded for the major part of its length, as is indicated at 8. Below the part 8 said stem has a portion 9 fitting rotatively within the nozzle 4 and formed with a spiral fin or thread of greater pitch than that of the part 8. Thus the portion 9 is adapted, when the stem is rotated, to function as an ejector for extruding the grease from said nozzle. The plunger comprises, first, a nut 10 engaging the threads 8 of the stem and having the integral annular flange 11 fitting fairly free within the cylinder. 12 and 13 designate alternating thin metal disks and upwardly dished washers mounted upon the nut 10 and firmly clamped against each other and against the under face of the flange 11, which face is dished to correspond to the washers. Thus the disks 12 originally flat, are deflected to conform to the dished shape of the washers. To maintain the described relation of the parts, the lower end portion of the nut 10 is marginally upset, as indicated at 14 to rivet the assembled parts upon said nut. The washers 13 are peripherally beveled as indicated at 15 and have the marginal portions 16 of their under faces plane (instead of dished). Thus there is afforded a slight clearance for the marginal portions of the disks 12, both above and below the same, the utility of which will presently appear.

In the operation of the described invention, when the knob 6 is turned, the stem 5 is rotatively actuated, while held from longitudinal movement by said knob, supplemented by the collar 7. The nut 10, through its engagement with the threads 8 of the sleeve, feeds the plunger downwardly or upwardly within the cup, according to the direction in which the knob 6 is turned. If the direction of movement of the plunger is downward, pressure is placed upon the mass of grease in the cup to force the same into the nozzle 4. At the same time the relation of the portion 9 of the stem within said nozzle acts to eject the grease therefrom so as to relieve the pressure opposing the movement of the plunger. The upward reaction of the grease against the downwardly moving plunger will act upon the free marginal portions of the disks 12 to slightly reduce the flare of said disks, thereby adding slightly to their diameter and increasing the sealing pressure marginally exerted by the disks upon the interior wall of the cup. When the plunger is being raised the margins of the disks again assume their normal flare, and a corresponding diameter, such as will permit the upward movement to occur with relative freedom.

Thus it is seen that any upward leakage of grease past the plunger on the pressure stroke thereof is very effectually prevented. Also provision of the ejector member 9 within the nozzle 4 is of value in preventing such leakage, since the pressure necessary to eject the grease by the plunger is naturally reduced by the use of said ejector.

What I claim is:

1. In a grease cup, a plunger comprising a cylindrical nut integrally formed with a dished annular flange and an axially extending tubular rivetable shank, a plurality of normally flat flexible disks alternating with spacing washers upon said shank, and a dished clamping washer secured upon said shank by riveting the latter to conform said disks to the dished form of said flange.

2. In a grease cup, a plunger comprising a cylindrical nut integrally formed with an annular flange and an axially extending tubular rivetable shank, a plurality of normally flat flexible disks alternating with dished washers upon said shank, and a clamping washer secured upon said shank by riveting the latter to conform said disks to the form of said dished washers.

3. In a grease cup, a plunger comprising a cylindrical nut integrally formed with a concaved annular flange and a tubular rivetable shank extending axially therefrom, a plurality of normally flat flexible disks upon said shank, dished washers interposed between said disks, and a convex washer secured upon said shank by riveting the latter to clamp and conform said disks to the concavo-convex form of said flange and washers.

In testimony whereof I sign this specification.

FRED G. MEYER.